(12) United States Patent
Brown et al.

(10) Patent No.: US 7,211,206 B2
(45) Date of Patent: May 1, 2007

(54) CONTINUOUS FORMING SYSTEM UTILIZING UP TO SIX ENDLESS BELTS

(75) Inventors: Wade Brown, Ft. Myers, FL (US); Zachary Taylor, Yorba Linda, CA (US)

(73) Assignee: Century-Board USA LLC, Ft. Myers, FL (US)

( * ) Notice: Subject to any disclaimer, the term of this patent is extended or adjusted under 35 U.S.C. 154(b) by 141 days.

(21) Appl. No.: 10/764,013

(22) Filed: Jan. 23, 2004

(65) Prior Publication Data

US 2005/0161855 A1 Jul. 28, 2005

(51) Int. Cl.
*B29C 43/48* (2006.01)

(52) U.S. Cl. ............... 264/46.2; 264/165; 425/107; 425/193; 425/329; 425/371

(58) Field of Classification Search ............ 425/107, 425/193, 329, 371; 264/41, 46.2, 165, 167
See application file for complete search history.

(56) References Cited

U.S. PATENT DOCUMENTS

| | | | | |
|---|---|---|---|---|
| 529,535 | A | * | 11/1894 | Smith .................. 425/329 |
| 2,817,875 | A | * | 12/1957 | Harris et al. ............ 425/329 |
| 3,065,500 | A | * | 11/1962 | Berner ................ 425/329 |
| 3,528,126 | A | | 9/1970 | Ernst et al. |
| 3,736,081 | A | | 5/1973 | Yovanovich |
| 3,824,057 | A | * | 7/1974 | Kornylak et al. .......... 425/371 |
| 3,841,390 | A | | 10/1974 | DiBenedetto et al. |
| 3,890,077 | A | * | 6/1975 | Holman ................ 425/329 |
| 3,917,774 | A | * | 11/1975 | Sagane et al. ........... 425/329 |
| 4,060,579 | A | | 11/1977 | Schmitzer et al. |
| 4,078,032 | A | | 3/1978 | Wenner |
| 4,104,094 | A | | 8/1978 | Peterson |
| 4,120,626 | A | | 10/1978 | Keller |

(Continued)

FOREIGN PATENT DOCUMENTS

DE 23 51 844 4/1975

(Continued)

OTHER PUBLICATIONS

Co-pending U.S. Appl. No. 11/417,385, filed May 4, 2006, titled Continuous Forming System Utilizing up to Six Endless Belts, and assigned to the assignee of this application.

(Continued)

*Primary Examiner*—James P. Mackey
(74) *Attorney, Agent, or Firm*—Knobbe, Martens, Olson & Bear LLP (57) ABSTRACT

A system for providing shape and/or surface features to a moldable material includes, in an exemplary embodiment, at least two first opposed flat endless belts spaced apart a first distance, with each having an inner surface and an outer surface. The system also includes at least two second opposed flat endless belts disposed substantially orthogonal to the first two opposed endless belts and spaced apart a second distance. A mold cavity is defined at least in part by the inner surfaces of the at least two opposed flat endless belts. The system further includes a drive mechanism for imparting motion to at least two of the opposed flat endless belts.

36 Claims, 6 Drawing Sheets

U.S. PATENT DOCUMENTS

| | | | |
|---|---|---|---|
| 4,127,040 A | | 11/1978 | Moore et al. |
| 4,128,369 A | * | 12/1978 | Kemerer et al. ............ 425/371 |
| 4,143,759 A | | 3/1979 | Paradis |
| 4,164,439 A | | 8/1979 | Coonrod |
| 4,214,864 A | | 7/1980 | Tabler |
| 4,276,337 A | | 6/1981 | Coonrod |
| 4,290,248 A | | 9/1981 | Kemerer et al. |
| 4,330,494 A | * | 5/1982 | Iwata et al. ................. 264/46.2 |
| 4,347,281 A | | 8/1982 | Futcher et al. |
| 4,382,056 A | | 5/1983 | Coonrod |
| 4,383,818 A | | 5/1983 | Swannell |
| 4,395,214 A | | 7/1983 | Phipps et al. |
| 4,396,791 A | | 8/1983 | Mazzoni |
| 4,450,133 A | | 5/1984 | Cafarelli |
| 4,489,023 A | | 12/1984 | Proksa |
| 4,512,942 A | | 4/1985 | Babbin et al. |
| 4,532,098 A | | 7/1985 | Campbell et al. |
| 4,540,357 A | | 9/1985 | Campbell et al. |
| 4,597,927 A | | 7/1986 | Zeitler et al. |
| 4,832,183 A | | 5/1989 | Lapeyre |
| 4,948,859 A | | 8/1990 | Echols et al. |
| 4,995,801 A | | 2/1991 | Hehl |
| 5,149,722 A | | 9/1992 | Soukup |
| 5,330,341 A | | 7/1994 | Kemerer et al. |
| 5,340,300 A | * | 8/1994 | Saeki et al. ................. 425/329 |
| 5,375,988 A | | 12/1994 | Klahre |
| 5,458,477 A | * | 10/1995 | Kemerer et al. ............ 425/371 |
| 5,505,599 A | | 4/1996 | Kemerer et al. |
| 5,527,172 A | | 6/1996 | Graham, Jr. |
| 5,582,840 A | | 12/1996 | Pauw et al. |
| 5,700,495 A | * | 12/1997 | Kemerer et al. ............ 425/371 |
| 5,844,015 A | | 12/1998 | Steilen et al. |
| 6,264,462 B1 | | 7/2001 | Gallagher |
| 6,321,904 B1 | | 11/2001 | Mitchell |
| 6,343,924 B1 | * | 2/2002 | Klepsch .................... 425/371 |
| 6,467,610 B1 | | 10/2002 | MacLachlan |
| 6,571,935 B1 | | 6/2003 | Campbell et al. |
| 6,605,343 B1 | | 8/2003 | Motoi et al. |
| 6,617,009 B1 | | 9/2003 | Chen et al. |
| 2001/0009683 A1 | * | 7/2001 | Kitahama et al. ........... 425/4 C |
| 2005/0011159 A1 | | 1/2005 | Standal et al. |
| 2005/0161855 A1 | | 7/2005 | Brown et al. |
| 2005/0287238 A1 | | 12/2005 | Taylor |
| 2006/0071369 A1 | | 4/2006 | Butteriss |

FOREIGN PATENT DOCUMENTS

| | | |
|---|---|---|
| JP | 55-80456 | 6/1980 |
| KR | 2002-0086327 | 11/2002 |
| WO | WO 97/11114 | 3/1997 |
| WO | WO 98/08893 | 3/1998 |
| WO | WO 99/39891 | 8/1999 |
| WO | WO 2004/113248 | 12/2004 |
| WO | WO 2006/012149 | 6/2005 |
| WO | WO 2005/072187 | 8/2005 |

OTHER PUBLICATIONS

Co-pending U.S. Appl. No. 11/593,316, filed Nov. 6, 2006, titled Method for Molding Three-Dimensional Foam Products Using a Continuous Forming Apparatus, and assigned to the assignee of this application.

Oertel, G., Editor; Polyurethane Handbook Second Edition; pp. 136-136, 182-183, 252-253; Carl Hanser Vertag, Munich. (1994).

* cited by examiner

CONTINUOUS FORMING SYSTEM UTILIZING UP TO SIX ENDLESS BELTS

BACKGROUND OF THE INVENTION

1. Field of the Invention

The invention relates to methods and systems for imparting desired shape and surface characteristics to a moldable or pliable material as the material cures or hardens. It is particularly applicable to the shaping and embossing of thermosetting resin systems during curing, and can be used to form these resin systems into a variety of products, including synthetic lumber, roofing, and siding.

2. Description of Related Art

Various techniques exist for continuously forming a soft or moldable material while it hardens or cures. For example, conveyor belts can be used to provide continuous support and movement for materials, and in some cases the belt faces may be contoured or profiled to mold the surfaces of the material and to impart a shape, feature, or surface appearance to the material. Two or more such belts may be configured to operate with the belt surfaces opposed and the material to be molded or shaped disposed between them. These systems can form fairly detailed three-dimensional products.

However, when such systems are used to form a foamed product, the structure of the overall system must be sufficiently strong to contain the pressure of the expanding foam. The longer the forming system and the larger the cross-section of the product to be formed, the greater the total force due to pressure and friction that the system must contain and overcome. As a result, in general, belt systems have not been thought to be suitable for formation of resin systems that involve foaming of the polymer matrix.

Forming systems have been developed to produce large rectangular polyurethane foam buns; these systems typically contain the foaming material within roller-supported films or sheets. The many rollers used in these systems contain the increase in pressure due to foaming, and also help to minimize system friction. However, these systems are generally not able to mold detail or texture into the product surface.

Pullers are two-belted machines designed to grip and pull an extruded profile. As indicated above, conventional two-belt systems, such as pullers that utilize thick profiled belts, may be configured to continuously mold detail and texture into a product. However, these forming systems typically require profiled belts with relatively thick sidewall cross sections. The thick sidewalls minimize deflection of the unsupported sides of the mold-belt, thereby maintaining the intended product shape, and limiting extrusion of material through the resultant gap between belts. The thickness of the product formed by a conventional two-belt system is thus limited in practice by the thickness and width of the profiled mold-belts. Thicker belts needed to form products with deeper profiles require larger diameter end pulleys in order to prevent excessive bending, stretching, and premature breakage of the mold material.

In addition, most pullers are relatively short (6 feet or less). These short forming systems tend to require slower production speeds, allowing the product enough time in-mold to harden sufficiently before exiting the forming unit. Longer two-belt machines can be made, but in order to manage belt/bed friction these longer systems typically require the use of rollers to support the back of the profiled belts. Roller supported mold-belts tend to allow the mold faces to separate between rollers where the belts are unsupported, allowing material to leak between belt faces.

To continuously mold larger foamed cross-sections and to impart irregular shape or surface detail to the product, table-top conveyors are frequently used. Table-top conveyors use segmented metal mold sections attached to a metal chain-type conveyor. Two table-top conveyors are typically arranged face-to-face when used in this type of application, providing a rigid continuous mold. Preventing material from migrating into the joints between adjacent mold sections can be problematic for this type of forming system and may required the use of plastic films disposed between the mold and material to prevent leaks. In addition, such table-top conveyor systems are complex and costly.

Because of the various difficulties and deficiencies described above for existing forming systems, there remains a need in the art for a low cost forming system that can shape a curing polymer system, and in particular a foaming polymer system, without leaking. There is a need for such a system that can impart surface patterns and designs to the curing material, and that has sufficiently low friction and thickness that it can be practically made long enough to allow sufficient curing time in the system.

SUMMARY OF THE INVENTION

The invention disclosed in this application is a new type of forming system utilizing up to six belts. The forming system is uniquely suited to the continuous forming of a range of product sizes with intricate molded-in detail. Material that may be formed using the described system include but are not limited to: thermoplastic and thermoset plastic compounds, highly-filled plastic compounds, elastomers, ceramic materials, and cementitious materials. The system is particularly suited to the forming of foamed materials. The material to be formed may be poured, dropped, extruded, spread, or sprayed onto or into the forming system.

In one embodiment, the invention relates to a system for providing shape, surface features, or both, to a moldable material, the system having:

at least two first opposed flat endless belts disposed a first distance apart from each other, each having an inner surface and an outer surface;

at least two second opposed flat endless belts disposed substantially orthogonal to the first two opposed endless belts and a second distance apart from each other, and each having an inner surface and an outer surface;

a mold cavity defined at least in part by the inner surfaces of at least two of the opposed flat endless belts; and a drive mechanism for imparting motion to at least two of the opposed flat endless belts.

In a more particular embodiment, the invention relates to a forming system having 4 flat belted conveyors configured so as to define and enclose the top, bottom, and sides of a 4-sided, open-ended channel, and an additional two profiled mold-belts that are configured to fit snugly, face-to-face within the channel provided by the surrounding flat belts. All belts are endless and supported by pulleys at the ends of their respective beds so as to allow each belt to travel continuously about its fixed path.

In another embodiment, the invention relates to a method of continuously forming a moldable material to have a desired shape or surface feature or both, comprising:

introducing the moldable material into an end of a mold cavity formed at least in part by the inner surfaces of two substantially orthogonal sets of opposed flat belts;

exerting pressure on the moldable material through the opposed flat belts;

transferring the moldable material along the mold cavity by longitudinal movement of the belts;

after sufficient time for the material to cure or harden into the molded configuration and thereby form molded material, removing the molded material from the mold cavity.

The system and method are versatile, permitting the production of a range of product sizes and profiles using the same machine. In an exemplary embodiment, the system and method provide for the continuous forming of synthetic lumber, roofing tiles, molded trim profiles, siding or other building products from heavily-filled, foamed thermoset plastic compounds and/or foamed ceramic compounds with organic binders.

BRIEF DESCRIPTION OF DRAWINGS

FIG. 1A is a top plan view, FIG. 1B is a side plan view.

DETAILED DESCRIPTION OF SPECIFIC EMBODIMENTS

For clarity of understanding, the invention will be described herein with respect to a single apparatus. It should be understood, however, that the invention is not so limited, and the system and method of the invention may involve two or more such systems operated in series or in parallel, and that a single system may contain multiple sets of belts, again operated in series or in parallel.

Flat-Belted Conveyor Channel

Each set of opposed flat belt conveyors are oriented so that their bearing surfaces face each other. One set of opposed flat belts can be thought of as "upper" and "lower" belts, although these descriptors are not limiting, nor do they require that the two opposed belts be horizontal. In practice, however, one set of opposed belts (the upper and lower belts) will be substantially horizontal. These belts can define the upper and lower surfaces of a mold cavity (when the device is operated in four-belt mode), or may provide support and drive surfaces for a set of opposed profile mold belts (when the device is operated in six-belt mode). The remaining set of opposed flat belts are disposed substantially orthogonal to the first set. As used herein, the term "substantially orthogonal" means close to perpendicular, but allowing for some deviation from 90° resulting from adjustment of the device, variations from level in the manufacturing floor, etc. This substantially orthogonal arrangement is accomplished in two basic configurations.

Figure 1A:
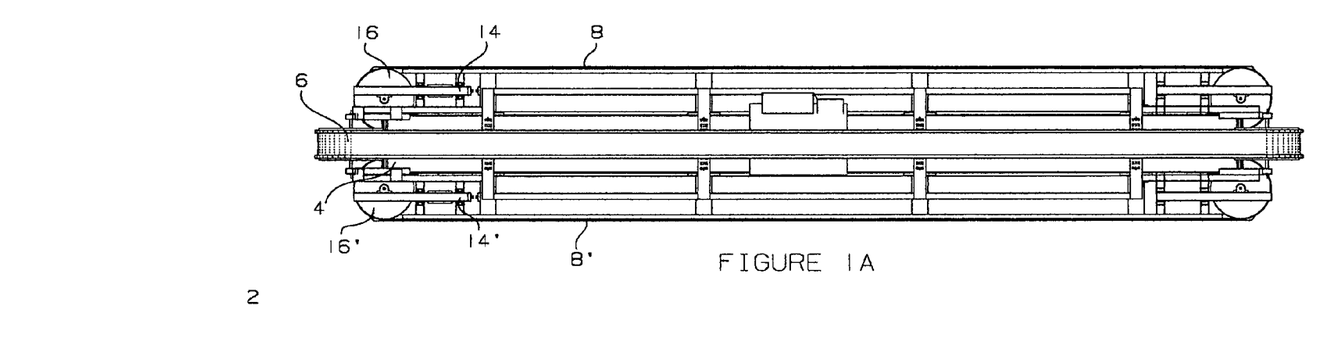
Figure 5:
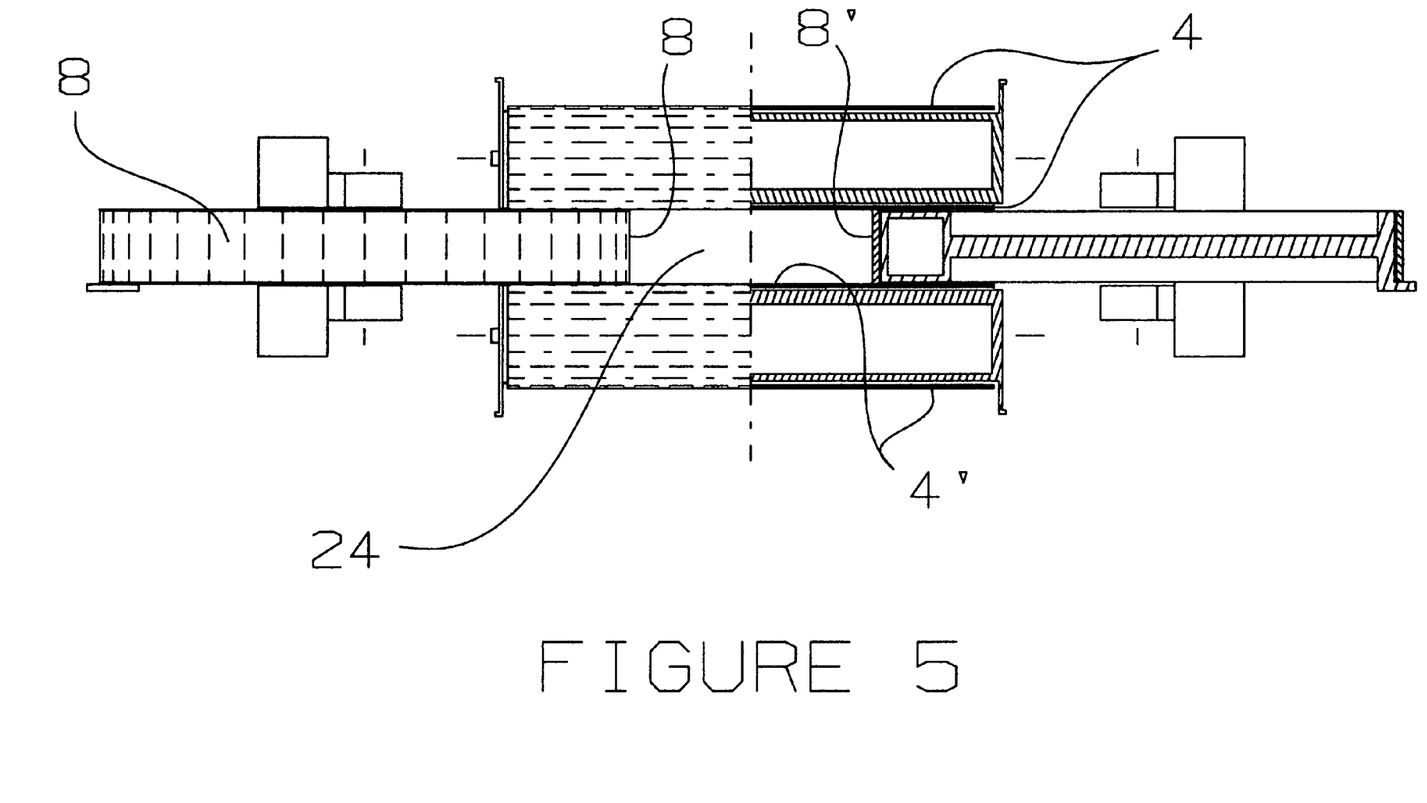
FIG. 5 is a partial sectional, partial end plan view of a four belt configuration of the system of the invention.

The first exemplary configuration involves disposing the flat bearing surfaces of the second set of belts along the sides of the space formed by the first set of belts, thereby forming an open-ended mold cavity that is enclosed by flat belts, and having a length corresponding to the length of the "side" belts. This configuration is illustrated in FIG. 5. FIG. 1A provides a top view, FIG. 1B a side view, and FIG. 1C an end view, of a system 2 having upper flat belt 4, lower flat belt 4' upper profile mold belt 6, lower profile mold belt 6', and side belts 8 and 8'. These side belts extend longitudinally approximately the same distance as the upper and lower flat belts, providing a mold cavity that is supported from the side over virtually the entire length of the profile mold belts. Profile mold belts 6 and 6' are maintained in tension by tensioning rolls 10. Flat belts 4 and 4' are powered by driven rollers 12 and 12'.

Figure 2:
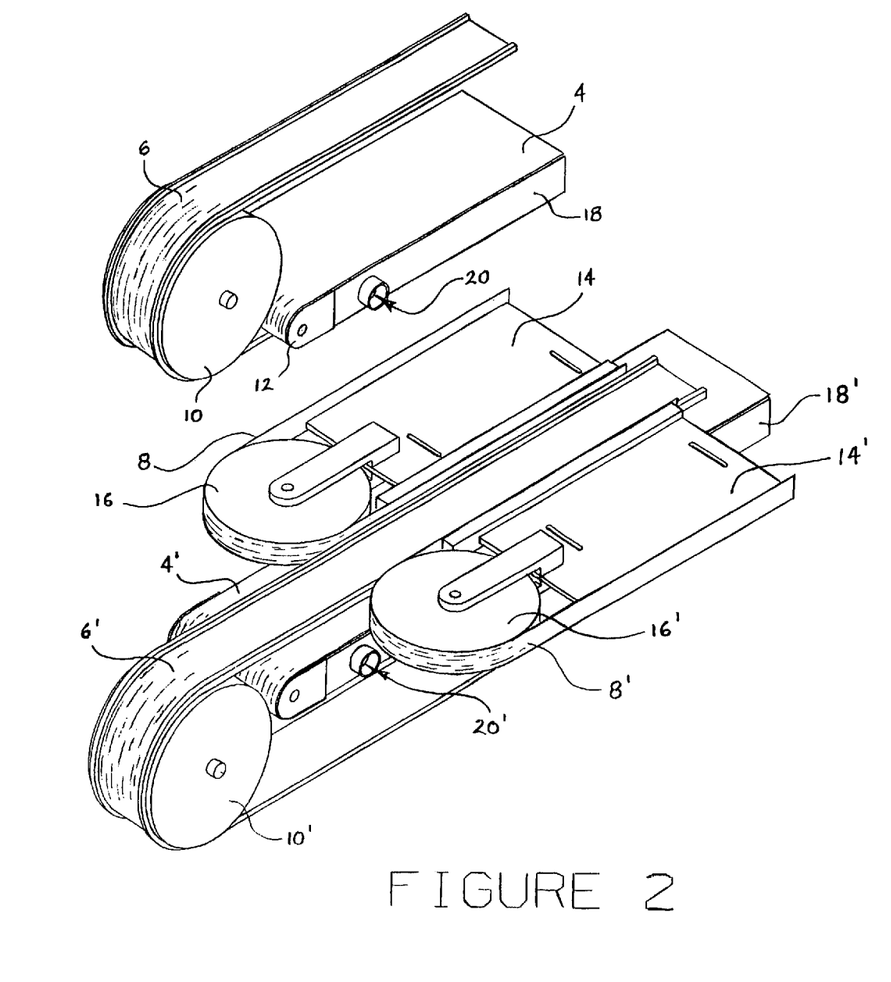
FIG. 2 is a partially expanded isometric view of one end of the system illustrated in FIG. 1.

The arrangement of belts and the corresponding rollers for this exemplary configuration can be seen in more detail in FIG. 2, which is a partially expanded view, wherein the upper flat belt 4, upper profile mold belt 6, and corresponding supports and rollers 10 and 12, have been lifted away from the remainder of the system for ease of visualization. Side belts 8, 8' are supported by side belt supports 14 and 14', and can run on side belt support rollers 16, 16'. These side belt support rollers are powered, or unpowered, as illustrated in FIG. 2. In addition, upper and lower flat belts 4 and 4' are supported by rigid supporting surfaces, such as platens 18, 18'.

As mentioned above, each flat belt is supported by a slider-bed or platen comprised of a rigid metal plate or other rigid supporting surface, if the length of the belt makes such support necessary or desirable. Generally, in order to provide sufficient curing time for filled polyurethane foams, a support surface is desirable but not required. The surface of the slider-bed in one embodiment has a slippery coating or bed-plate material attached or bonded to it (for example, ultra-high molecular weight polyethylene, PTFE, or other fluoropolymer). Also, the belt has a slippery backing material (for example, ultra-high molecular weight polyethylene, PTFE or other fluoropolymer) to reduce friction between the bed and moving belt in an exemplary emboidment.

To further reduce friction and enhance cooling of the belts and conveyor machinery, the slider-beds and attached slippery surface material of a conveyor has a plurality of relatively small holes drilled through the surface These holes are in fluid communication with a source of compressed gas, such as air. As an example, a plenum chamber is provided behind each slider bed, which is then connected to a source of pressurized air. Pressurized air fed into each plenum passes through the holes in the bed, and provides a layer of air between the bed and the adjacent belt. This air film provides lubrication between the bed and adjacent belt as shown in FIG. 2., where compressed air is supplied to the plenums through openings 20, 20' The air fed into the plenums has a pressure higher than the foaming pressure of the product to be useful in reducing operating friction. In one embodiment, shop air or high-pressure blowers are used to provide the pressurized air to feed the plenums.

Figure 6:
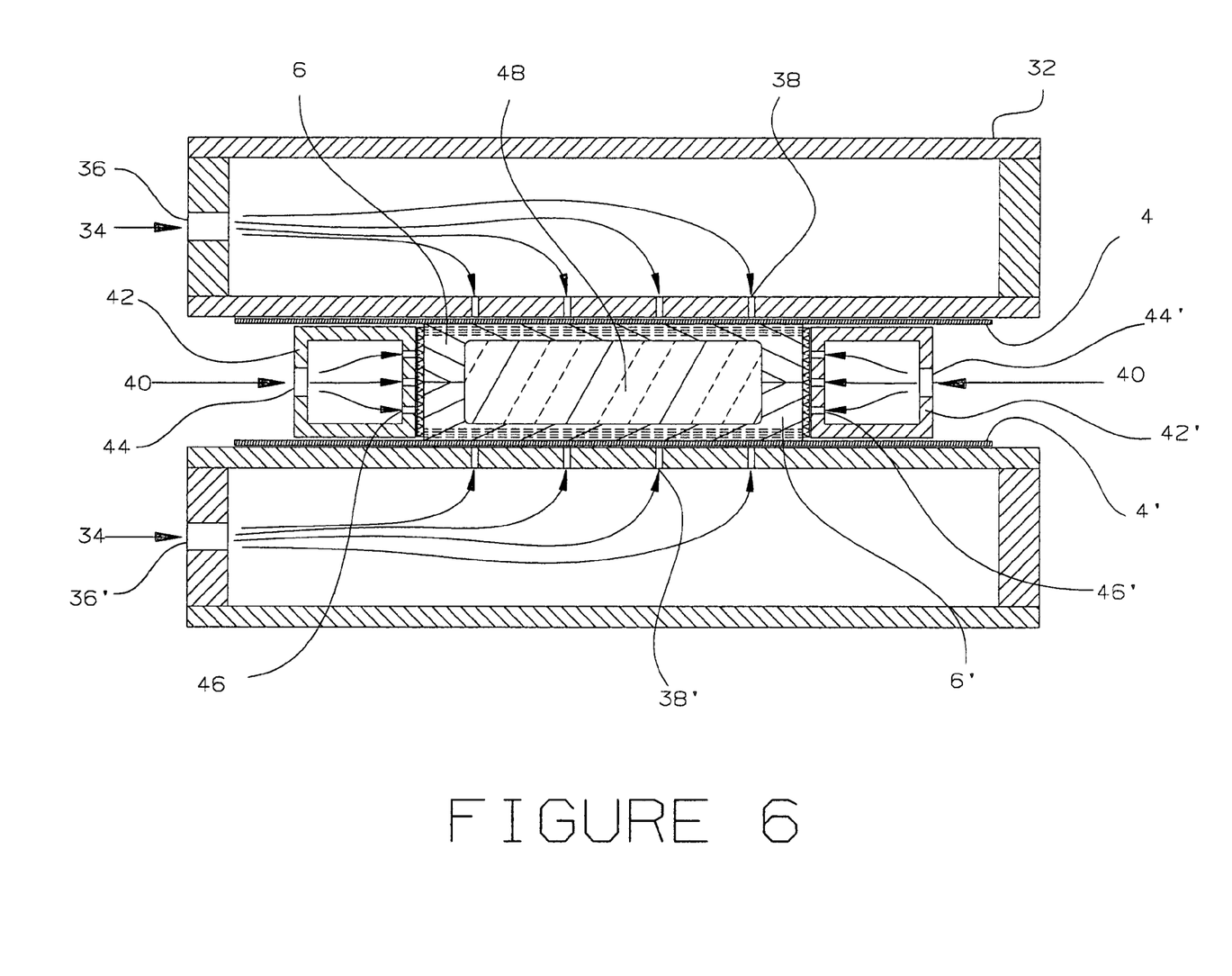
FIG. 6 is a sectional view of a configuration of the system of the invention using drive belts and supporting the sides of the mold belts with pressurized air.

In a more particular exemplary embodiment, shown in FIG. 6, air supply plenums are also used to provide support to the sides of the mold belts, either directly (shown) or through side belts (not shown). In FIG. 6, flat belts 4 and 4' are supported by upper and lower air supply plenums 32 and 32', respectively. Areas of contact between the belts and the plenums are prepared from or coated with a low-friction substance, such as PTFE, or are lubricated to lower the friction between the belts and the supporting surfaces. Pressurized air 34 is supplied to these plenums through openings 36, 36', and exits the plenums through openings 38, 38', where it flows under and supports flat belts 4, 4', which in turn support the upper and lower surfaces of profile mold belts 6, 6'. In addition, pressurized air 40 enters side plenums 42, 42' through openings 44, 44'. The air leaves these side plenums through opening 46, 46', and flows against and supports the sides of profile mold belts 6, 6'. This support can result either from the air flow impinging directly on the sides of the mold belts, or from air flow impinging on the surfaces of side belts that in turn press against the sides of the profile mold belts. The profile mold belts, in turn, provide support to the material being formed, 48.

Figure 1B:
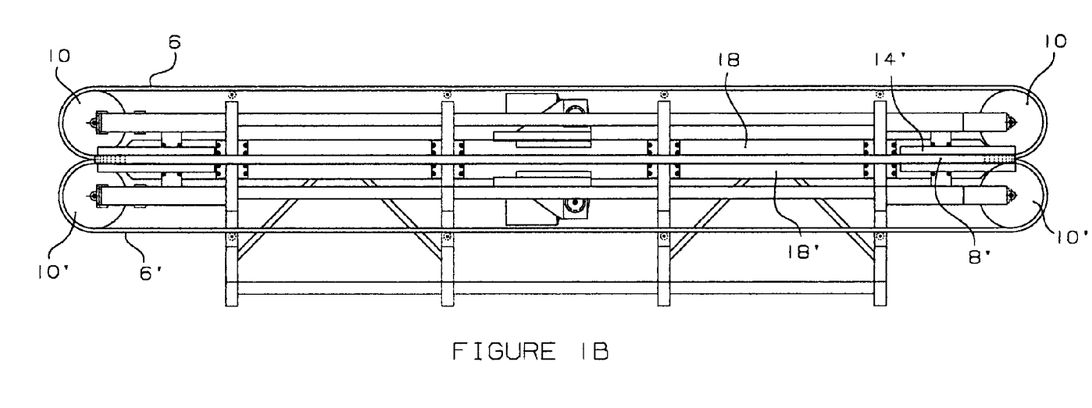
Figure 1C:
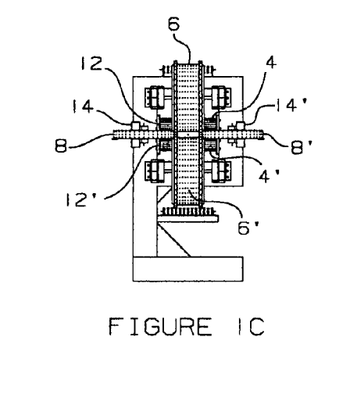
FIG. 1C is an end plan view of one embodiment of a system of the invention.

The flat-belts are powered and driven at matching speeds with respect to one another. The matched speed are achieved, in one embodiment, by mechanical linkage between the conveyors or by electronic gearing of the respective motors. Alternatively, an as illustrated in FIGS. 1 and 2, only two flat belts are driven (for example, the two opposing belts with greater contact area, which are typically the upper and lower belts) with the remaining two flat belts (for example, the side belts) un-driven and idling. The flat-belts form a relatively rigid moving channel through which contoured mold-belts and/or forming product is moved and contained.

The driven flat-belts utilize known driven roller technologies, including center-drive pulley mechanisms, whereby more than 180° of contact is maintained between each conveyor's driving pulley and belt, increasing the amount of force that may be delivered to the belt.

Figure 3A:
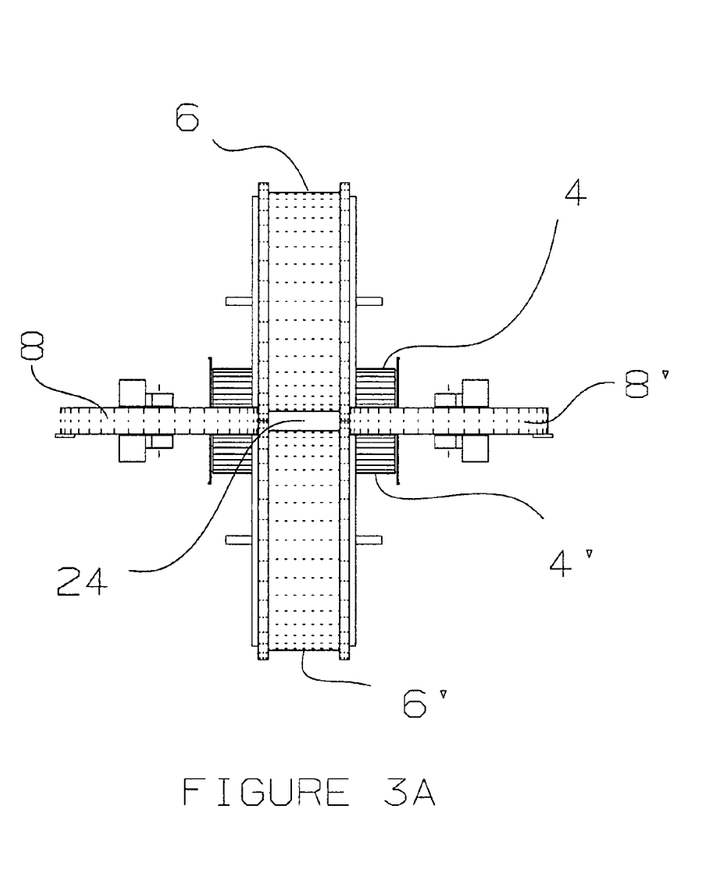
FIG. 3A is an end plan view of one embodiment of the system of the invention.
Figure 3B:
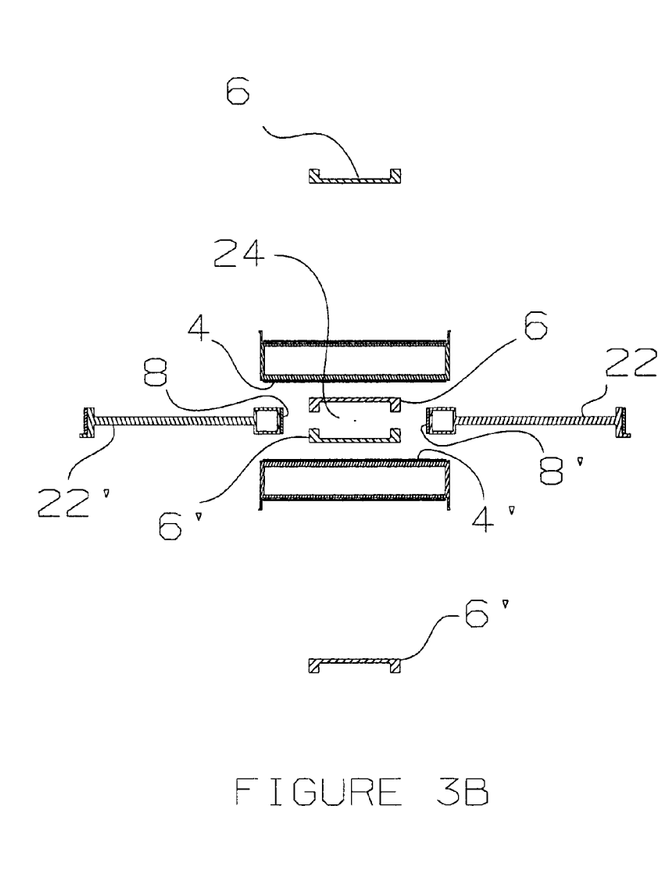
FIG. 3B is an exploded sectional view of the system of FIG. 3A.

In another exemplary configuration, the side flat belts are disposed substantially orthogonal relative to the upper and lower flat belts such that their bearing surfaces face each other, and are in a plane substantially perpendicular to the plane of the bearing surfaces of the upper and lower belts, as illustrated in FIG. 3. FIG. 3A is an end view with the corresponding drive and support apparatus removed for ease of viewing. FIG. 3A shows side flat belts 8 and 8' disposed between upper flat belt 4 and lower flat belt 4'. An expanded sectional view of this exemplary configuration is provided in FIG. 3B. The frames 22 and 22' supporting the side belts are restrained in such a way as to allow the position of the side flat belts to be adjusted laterally providing the desired degree of pressure against the sides of profile mold belts 6 and 6' or to accommodate mold belts of alternate widths. This configuration provides a relatively short, but highly contained mold cavity 24.

Mold-Belts

Figure 4:
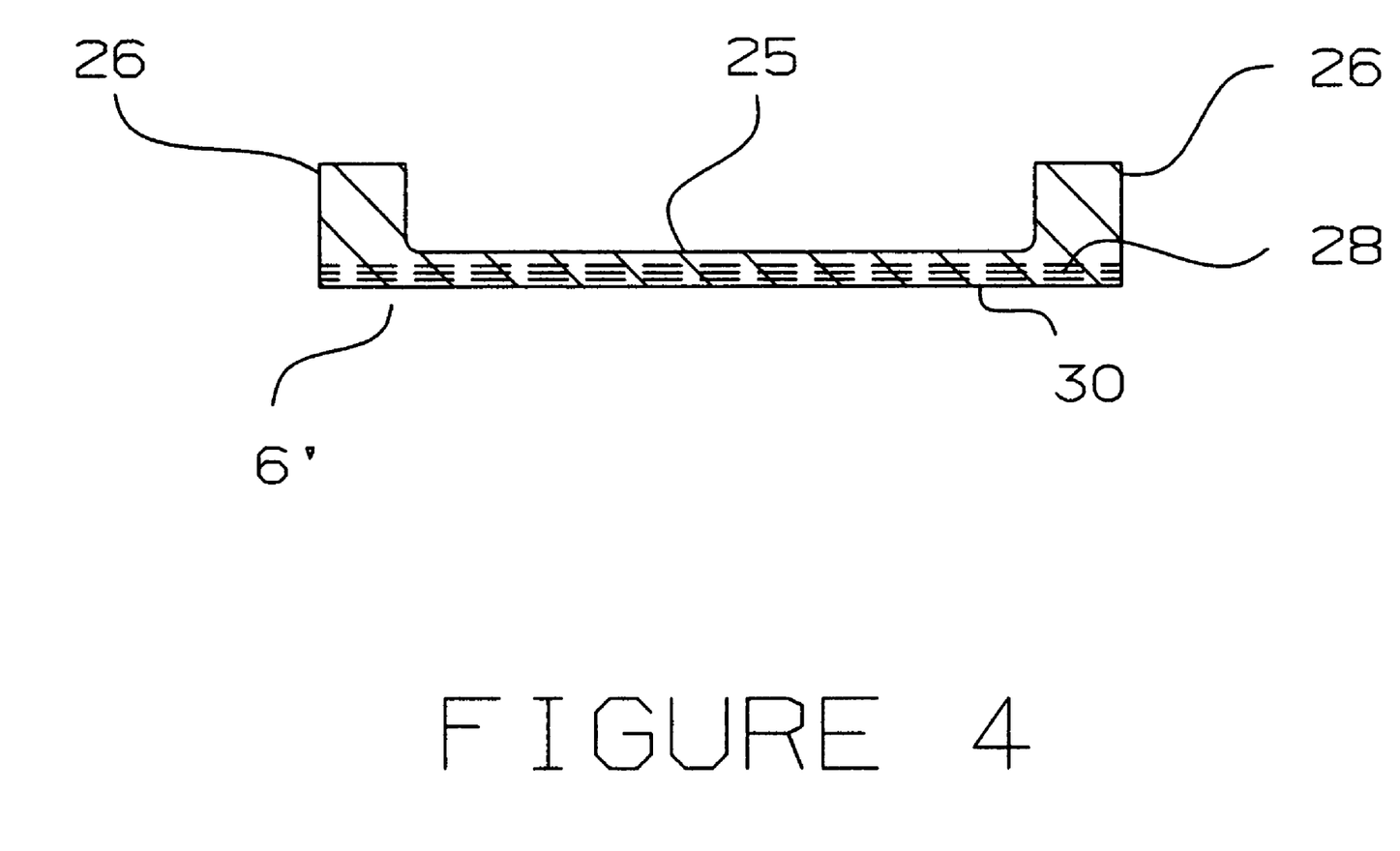
FIG. 4 is a sectional view of a profile mold belt used in certain embodiments of the system of the invention.

The contoured mold-belts are relatively thick belts with a rubbery face material attached to a fiber-reinforced backing or carcass as shown in FIG. 4. The profile mold belt 6' is constructed to contain an inner surface 25, that defines part of mold cavity 24. It also has side surfaces 26, which contact side flat belts 8, 8', and outer surface 30, which contacts the inner surface of flat belt 4'. The fiber-reinforcement 28 in the backing of the belts will provide the strength and rigidity in the belt while the face material has the profile, surface features, and texture that is molded into the product. The desired mold profile, surface features, and texture are machined, cut, bonded, and/or cast into the surface of the mold-belts. The mold cavity created by the mold belts has a constant, irregular, and/or segmented cross section. Multiple cavities can be incorporated into a single set of mold belts. Suitable mold surface materials include, but are not restricted to Nitrile, Neoprene, polyurethane, silicone elastomers, and combinations thereof. Suitable fibers for reinforcing the profile mold belt include cotton, aramid, polyester, nylon, and combinations thereof.

Each profile mold-belt travels beyond the ends of the surrounding flat-belt conveyors to a separate set of large pulleys or rollers that maintain tension and the relative position of each belt. In one embodiment, the mold-belts are un-powered, functioning as idlers or slave belts to the powered flat belts behind them. In another embodiment, the mold belts are separately powered.

The temperature of the mold belts can be adjusted during production in the event that additional heat is needed or surplus heat is to be removed. If the temperature of the belt surface is adjusted, temperature controlled air is blown onto the belt surfaces as the belts exit the flat-belted conveyor enclosure and follow their return path to the entrance of the forming machine. In one embodiment, infrared or other radiant heaters are used to increase the temperature of the mold surface. In another embodiment, temperature controlled air or other fluid is routed through the conveyor frames to maintain predetermined process temperatures.

Orientation

As described above, the exemplary orientation of the forming system is for the contact surface between mold-belts to be horizontal. The gap between the upper and lower flat-belted conveyors (those conveyors adjacent to the backs of the mold-belts), can be precisely maintained such that the pair of mold-belts pass between them without being allowed to separate (presenting a gap to the molding material) and without excessively compressing the mold-belt shoulders or side walls. In the exemplary embodiment, the upper conveyor is removable while not in operation in order to permit replacement of the mold belts.

Side Conveyors

The flat-belted conveyors adjacent to the sides of the profile mold belts provide structural support for the sides of the mold cavity, resist any deflection of the sides due to foaming pressure, and maintain alignment of the mold-belts. These side-supporting conveyors permit the use of thinner mold-belt sidewalls, which reduces the cost and mass of the mold-belts. The use of these side-supporting conveyors also permits the molding of deeper product cross sections without requiring excessive mold-belt widths.

System Versatility

An exemplary configuration for the flat-belted conveyors is for the top and bottom conveyors to be wide, with the side conveyors sized to fit between the belts of the upper and lower conveyors in such a way that the surface of the upper and lower (wide) belts approach or make contact with the edges of the side belts. The frames, pulleys, and slider-beds of the side conveyors are slightly narrower than their respective belts to avoid contact with the upper and lower belts. A cross section of this exemplary configuration is shown in FIG. 3B as described above. With this orientation, the gap between the side conveyors is adjustable in order to accommodate wider or narrower pairs of mold-belts. This configuration permits a range of product widths to be produced by the same forming machine. Only the mold-belt set is replaced in order to produce product of a different width.

To further increase the versatility of the forming machine, the side conveyor belts, pulleys, and slider beds are replaced with taller or shorter components and the gap between upper and lower conveyors adjusted accordingly. This feature permits the forming machine to accommodate mold-belts of various depths to produce thicker or thinner cross sections.

Four-Belt Mode

The specific exemplary embodiments described above with respect to the drawings generally relate to configuration of the system in "six belt mode." In other words, an upper and lower flat belt, two side flat belts, and an upper and lower profile mold belt. The mold belts permit surface details, corner radii, irregular thicknesses, and deeper surface texture to be molded into the continuously formed product. However, for rectangular or square cross-sectioned products that do not require corner radii, deep texture, or localized features, the forming system is used without mold-belts, and operated in "four belt mode." In this exemplary operating configuration the four flat belts make direct contact with the moldable product and permits the product to form within the flat-sided cavity. When the forming system is used in this configuration it is important that the upper and lower belts maintain contact with the edges of the side belts to prevent seepage of the material between adjacent belts. In order to produce thicker or thinner products in "four belt mode" the side flat belts, adjacent slider beds, and side belt pulleys are replaced with components in the target thickness. The gap between side belts is adjusted to accommodate the target width. Using this approach a large variety of four-sided cross-sections can be produced by the same machine without the added cost of dedicated mold-belts.

The four belt configuration is illustrated in FIG. 5. The sectional portion of the drawing shows that the mold cavity 24 is formed by the surfaces of upper and lower flat belts 4, 4' and the surfaces of side belts 8, 8'.

Fabrication

The forming system structure may be fabricated using metal materials and typical metal forming and fabricating methods such as welding, bending, machining, and mechanical assembly.

The forming system is used to form a wide variety of moldable materials, and has been found to be particularly suitable for forming synthetic lumber.

Although the descriptions above describe many specific details they should not be construed as limiting the scope of the invention or the methods of use, but merely providing illustration of some of the presently preferred embodiments of the invention.

What is claimed is:

1. A system for providing shape, surface features, or both, to a moldable material, comprising:
    at least two first opposed flat endless upper and lower belts attached to a first set of rollers and spaced apart a first distance, each having an inner surface and an outer surface, wherein the outer surface of each of the upper and lower belts is supported by a rigid supporting surface;
    at least two second opposed flat endless belts disposed substantially orthogonal to the first two opposed endless belts and spaced apart a second distance, each having an inner surface and an outer surface;
    at least two endless opposing profile mold belts attached to a second set of rollers, each profile mold belt having an inner and an outer surface, each of the outer surfaces in partial contact with the inner surfaces of the first opposed flat endless belts;
    a mold cavity defined at least in part by the at least two endless opposing profile mold belts; and
    a drive mechanism for imparting motion to at least two of the opposed flat endless belts.

2. The system of claim 1, wherein the rigid supporting surface comprises a slider bed or platen.

3. The system of claim 1, wherein the outer surfaces of the first opposed flat endless upper and lower belts comprise a coating of a friction reducing substance.

4. The system of claim 3, wherein the friction reducing substance comprises a fluoropolymer, or ultra-high molecular weight polyethylene.

5. The system of claim 1, further comprising an air-film lubrication system adapted to reduce friction between the at least two first or second opposed flat endless belts and the rigid supporting surface.

6. The system of claim 1, wherein the rigid supporting surface comprises a plurality of holes therein, in fluid communication with a plenum chamber located behind a slider bed or platen, and wherein the holes and plenum chamber are adapted to provide pressurized air film lubrication between at least one flat endless belt of the at least two first opposed flat endless belts and the rigid supporting surface.

7. The system of claim 1, wherein the first opposed endless belts or the second opposed endless belts, or both, are adjustable such that the first distance, or the second distance, or both, can be varied.

8. The system of claim 1, wherein at least one of the profile mold belts comprises an elastomeric face layer adapted to contact the moldable material, and a reinforced backing layer adapted to contact the inner surface of a belt of the at least two first or second opposed flat endless belts.

9. The system of claim 1, further comprising a plurality of a profile mold belt tensioners, adapted to maintain the profile mold belts in tension.

10. The system of claim 9, wherein at least one of the profile mold belt tensioners comprises one or more pulleys disposed such that the profile mold belt encloses at least a portion of the drive mechanism.

11. The system of claim 1, wherein the at least two first opposed flat endless belts and the profile mold belts are oriented substantially horizontally, and wherein the at least two second opposed flat endless belts disposed substantially orthogonal to the at least two first opposed endless belts are disposed substantially vertically.

12. The system of claim 1, wherein the first set of rollers are positioned internal in the system relative to the second set of rollers.

13. The system of claim 1, wherein the first set of rollers are positioned between the second set of rollers.

14. The system of claim 1, wherein the outer surfaces of the at least two endless opposing profile mold belts is partially not in contact with the inner surfaces of the first opposed flat endless belts.

15. The system of claim 1, wherein the at least two endless opposing profile mold belts are adapted to shape, or mold surface features, or both, into a moldable material.

16. A method of continuously forming a moldable material to have a desired shape or surface feature or both, comprising:
    introducing the moldable material into an end of a mold cavity formed at least in part by inner surfaces of two opposed profiled mold belts attached to a first set of rollers, the profile mold belts partially in contact with inner surfaces of two substantially orthogonal sets of opposed flat belts, wherein the two substantially orthogonal sets of opposed flat belts are supported by rigid supporting surfaces and are attached to a second set of rollers;
    exerting pressure by the rigid supporting surfaces on the moldable material through the opposed flat belts;
    transferring the moldable material along the mold cavity by driving the opposed flat belts by a drive mechanism to impart longitudinal movement of the belts;

after sufficient time for the material to cure or harden into the molded configuration and thereby form molded material, removing the molded material from the mold cavity.

17. The method of claim 16, wherein the moldable material comprises a filled thermoset plastic.

18. The method of claim 16, wherein the moldable material comprises a foamed or foaming material.

19. The method of claim 16, wherein the profile mold belts form the moldable material into a shape having a cross-section at least approximately corresponding to that of the mold cavity.

20. The method of claim 16, wherein the profile mold belts impart a surface pattern to the moldable material.

21. The method of claim 16, wherein the molded material comprises a synthetic lumber, roofing tiles, molded trim profiles, or siding.

22. A forming apparatus for forming a moldable material, said apparatus comprising:
a first upper belt attached to a first set of rollers;
a second lower belt attached to a second set of rollers opposed to said first upper belt, said first and second upper and lower belts spaced apart a first distance, each of said first and second upper and lower belts comprising an inner surface and an outer surface, and wherein said outer surface of said first and second upper and lower belts are supported by first rigid supporting surfaces;
a third belt;
a fourth belt opposed to said third belt, said third and fourth belts spaced apart a second distance and disposed substantially orthogonal to said first and second belts, each of said third and fourth belts comprising an inner surface and an outer surface;
a first mold belt attached to a third set of rollers, wherein the first mold belt is least partially in contact with said first upper belt,
a second mold belt attached to a fourth set of rollers and opposed to the first mold belt, wherein the second mold belt is at least partially in contact with said second lower belt;
a mold cavity defined in part by the first and second mold belts; and
a belt drive mechanism operationally coupled to at least two of said first, second, third, and fourth belts.

23. A forming apparatus in accordance with claim 22 wherein each said first supporting surface comprises a friction reducing substance.

24. A forming apparatus in accordance with claim 23 wherein said friction reducing substance comprises at least one of a fluoropolymer, and an ultra-high molecular weight polyethylene.

25. A forming apparatus in accordance with claim 22 wherein said first rigid supporting surfaces comprise a plurality of air passage openings in fluid communication with a pressurized air source to provide a pressurized air film between said outer surface of said first and second belts and said first rigid supporting surfaces.

26. A forming apparatus in accordance with claim 22 wherein at least one of said first, second, third, and fourth belts is adjustable so that at least one of said first distance and said second distance is variable.

27. A forming apparatus in accordance with claim 22 wherein each said mold belt comprises an elastomeric face layer for contacting the moldable material, and a reinforced backing layer for contacting said inner surface of said first or said second belt.

28. A forming apparatus in accordance with claim 22 wherein said outer surface of said third and fourth belts is supported by second rigid supporting surfaces.

29. A forming apparatus in accordance with claim 28 wherein each said second supporting surface comprises a friction reducing substance comprising at least one of a fluoropolymer, and an ultra-high molecular weight polyethylene.

30. A forming apparatus in accordance with claim 28 wherein each said second rigid supporting surfaces comprise a plurality of air passage openings in fluid communication with a pressurized air source to provide a pressurized air film between said outer surface of said third and fourth belts and said second rigid supporting surfaces.

31. A continuous forming apparatus for forming a moldable material, said apparatus comprising:
a first pair of opposed upper and lower closed loop conveyors spaced apart a first distance, and each supported by a first rigid supporting surface and attached to a first set of rollers;
a second pair of opposed closed loop conveyors spaced apart a second distance and disposed substantially orthogonal to said first pair of conveyors, and each supported by a second rigid supporting surface;
a pair of opposed mold members attached to a second set of rollers and at least partially in contact with the first pair of opposed upper and lower closed loop conveyors,
a mold cavity defined in part by an area between said pair of opposed mold members; and
a drive mechanism for imparting motion to at least one of the first or second pair of closed loop conveyors.

32. A continuous forming apparatus in accordance with claim 31 wherein at least one of said first rigid supporting surfaces and said second rigid supporting surfaces comprises a friction reducing substance.

33. A continuous forming apparatus in accordance with claim 32 wherein said friction reducing substance comprises at least one of a fluoropolymer, and an ultra-high molecular weight polyethylene.

34. A continuous forming apparatus in accordance with claim 31 wherein at least one said first rigid supporting surfaces and said second supporting surfaces comprises a plurality of air passage openings in fluid communication with a pressurized air source to provide a pressurized air film between said first and said second pairs of conveyors and said first and said second rigid support surfaces.

35. A continuous forming apparatus in accordance with claim 31 wherein at least one of said first pair of conveyors and said second pair of conveyors are adjusted so that at least one of said first distance and said second distance is variable.

36. A continuous forming apparatus in accordance with claim 31 wherein each said mold member comprises an elastomeric face layer for contacting the moldable material.

* * * * *